United States Patent [19]
Chen et al.

[11] Patent Number: 5,526,347
[45] Date of Patent: Jun. 11, 1996

[54] DECORRELATION CONTROLLER FOR AN ADAPTIVE ECHO CANCELLOR

[75] Inventors: Herbert M. Chen; V. Vijayakumaran Nair, both of Austin, Tex.

[73] Assignee: Advanced Micro Devices, Inc., Sunnyvale, Calif.

[21] Appl. No.: 970,088

[22] Filed: Nov. 2, 1992

[51] Int. Cl.$^6$ ............................................. H04B 3/20
[52] U.S. Cl. ................................. 370/32.1; 379/410
[58] Field of Search .................... 370/32, 32.1; 379/406, 379/410, 411

[56] References Cited

U.S. PATENT DOCUMENTS

| | | | |
|---|---|---|---|
| 4,896,318 | 1/1990 | Kokubo et al. | 370/32.1 |
| 4,922,530 | 5/1990 | Kenney et al. | 370/32.1 |
| 4,947,425 | 8/1990 | Grizmala et al. | 370/32.1 |
| 4,972,406 | 11/1990 | Dedic | 370/32.1 |

FOREIGN PATENT DOCUMENTS

| | | |
|---|---|---|
| 0053202 | 9/1982 | European Pat. Off. . |
| 2232563 | 12/1990 | United Kingdom . |

OTHER PUBLICATIONS

Ye et al, *A New Double–Talk Detection Algorithm Based on the Orthogonality Theorem*, IEEE Transactions on Communications, Nov. 1991, vol. 39, No. 11, pp. 1542–1545.
Patent Abstracts of Japan, vol. 9, No. 99, Apr. 27, 1985, & JP–A–59 225 626 (Nippon Denshin Denwa Kosha) Dec. 18, 1984.

*Primary Examiner*—Wellington Chin
*Attorney, Agent, or Firm*—Jenkens & Gilchrist

[57] ABSTRACT

A sign-based decorrelation detection and adaptive control arrangement includes structure for detecting cross-correlation between a far-end signal and an echo residual following a balance filter. During the adaptive process, if the detected correlation value is below a certain threshold, indicating that the two signals are decorrelated, the adaptation of the balancing filter is stopped. At such a point, proper echo cancellation has been achieved. Conversely, when the detected correlation value exceeds a threshold, the adaptation is ,continued until the correlation value falls below the threshold again. In any event, such decorrelation controllers are able to detect signal decorrelation and to control adaptation even in the presence of a double-talker condition.

8 Claims, 3 Drawing Sheets

5,526,347

DECORRELATION CONTROLLER FOR AN ADAPTIVE ECHO CANCELLOR

BACKGROUND OF THE INVENTION

1. Field of the Invention

The present invention relates to adaptive digital filters and, more particularly, to digital filter control means.

2. Description of Related Art

The present invention is an improvement upon the invention disclosed and claimed in U.S. Pat. No. 5,014,263. For convenience and to ensure completeness of the description herein, the material in U.S. Pat. No. 5,014,263 is hereby incorporated herein by this reference thereto.

The instant invention and the invention disclosed and claimed in U.S. Pat. No. 5,014,263 both generally relate to adaptive digital filters.

As pointed out in U.S. Pat. No. 5,014,263, digital filters may be used in telephony coder/decoders, such as subscriber line audio-processing circuits (SLACs), which require periodic updating of the filter coefficients. For example, a SLAC may employ an adaptive filter to cancel echoes, that is, reflected signals, which occur if there is an impedance mismatch between transmission lines and the interconnecting SLACs.

An adaptive filter continuously adjusts its coefficients to optimize the transfer function it implements. Without the adaptation feature, a user must calculate a few sets of filter coefficients for the most commonly-encountered subscriber line characteristics and then choose the closest set of coefficients suited to the particular line used in the application. The selected set will generally not provide the best echo cancellation under any circumstances, and will generally be especially ineffective if line impedance varies over time. By employing adaptation, a user does not have to calculate any coefficients. At the same time, the user gets a continuously updated echo-cancellation function which can respond to changing line characteristics.

Digitally-encoded audio signals are commonly transmitted on networks employing SLACs. Accordingly, there is a need for adaptive digital filters which provide an echo cancellation function. Another application for digital filtering is in modulator-demodulators (modems) used for transmission of digital data over telephone lines.

Because of procedures used during the dial tone connection of SLACs or modems, the adaptive echo cancellor should be deactivated to avoid degrading the push-button signal. Furthermore, the echo controller must be deactivated if there is a "talker" at the near end of the interconnection. The adaptive filter must be prevented from updating filter coefficients during either of these circumstances. Thus, "double talker" detection is advantageously used in conjunction with an adaptive filter.

The fundamental problem addressed by the echo control circuit of telephone subscriber line cards is the mismatch in the impedance characteristics of the two wire loop and the balancing network. Because of the mismatch, some energy from the receive far-end signal is reflected back at the 2 to 4 wire hybrid and turned into an unwanted near-end echo. In order to maximize the attenuation of a near-end echo, an adaptive filter usually is employed to perform an auto-balancing function. To perform this function, the filter automatically adjusts its response matching to a varying 2 wire loop impedance through a digital adaptive process.

Certain problems can arise during operation of adaptive filters. For example, an uncontrollable or excessive adaptation of a balance filter can result in filter divergence, which is functionally undesirable. Moreover, when both near-end and far-end signals appear at same time, the adaptation will be misguided because of the merging of the near-end speech and the echo. This latter problem may be addressed by a double-talker detector. A conventional way of detecting A double-talker condition is to compare the signal level at the near- and far-ends using energy-averaging filters. If the near-end signal level exceeds the signal level of the far-end by a predetermined amount, a double-talker condition is flagged .and adaptation is inhibited.

The double-talker detector discussed immediately above has several shortcomings and deficiencies. The detector is often unreliable because the near-end speeches or signal amplitude is unknown and because the associated cable loss is also varying. This unreliability also limits the utility of the detector. A reliable double-talker detector of a line card echo controller is critical for a reliable high speed modem connection because of the duplex operation performed. This duplex operation is similar to a double-talker condition. Failure to inhibit the adaptation of an echo controller during a modem connection can result in a high bit error rate or a connection hang-up.

Based upon the foregoing, it should be understood and appreciated that .it is a shortcoming and deficiency of the prior art that there has not heretofore been developed a simple, relatively inexpensive, and reliable means for controlling an adaptive balance filter that guards against tone divergence, that operates effectively in double-talker situations, and that readily allows modem connection.

SUMMARY OF THE INVENTION

The present invention comprises a sign-based decorrelation detection and adaptive control arrangement designed to detect cross-correlation between a far-end signal and an echo residual following a balance filter. During the adaptive process, if the detected correlation value is below a certain threshold, indicating that the two signals are decorrelated, the adaptation of the balancing filter will be stopped. At such a point, a proper echo cancellation has been achieved. Conversely, when the detected correlation value exceeds a threshold, the adaptation will be resumed until the correlation value falls below the threshold again. In any event, decorrelation controllers according to the teachings of the present invention maintain their capability to detect a signal decorrelation and to implement adaptation control even in the presence of a double-talker condition. This latter characteristic eliminates a need for a double-talker detector in embodiments of the present invention.

Accordingly, it is an object of the present invention to provide a means for controlling an adaptive balance filter that inhibits adaptation when a proper echo cancellation is reached and which resumes adaptation when an echo is not sufficiently cancelled. This prevents excessive adaptation of the balance filter which can cause tone divergence.

Another object of the present invention is to provide a-means for an adaptive balance filter to operate reliably under a double-talker operation without a need for a double-talker detector.

Yet another object of the present invention is to provide a decorrelation controller wherein the detection of the correlation value is independent of the presence of a near-end talker, that is, wherein adaptation may be stopped irrespective of the presence or actions of a near-end talker.

Still yet another object of the present invention is to provide a decorrelation controller especially well suited for use in high speed duplex modem applications without employing complicated modem tone detectors. It should also be appreciated that during the dial tone phase of DTMF reception of such modems or during normal connection, a double-talker situation exists and the adaptation needs to be halted.

BRIEF DESCRIPTION OF THE DRAWINGS

Other objects, advantages, and novel features of the present invention will become apparent based upon the following detailed description of the invention when taken in conjunction with the accompanying drawings wherein.

DETAILED DESCRIPTION OF THE INVENTION

Figure 1:
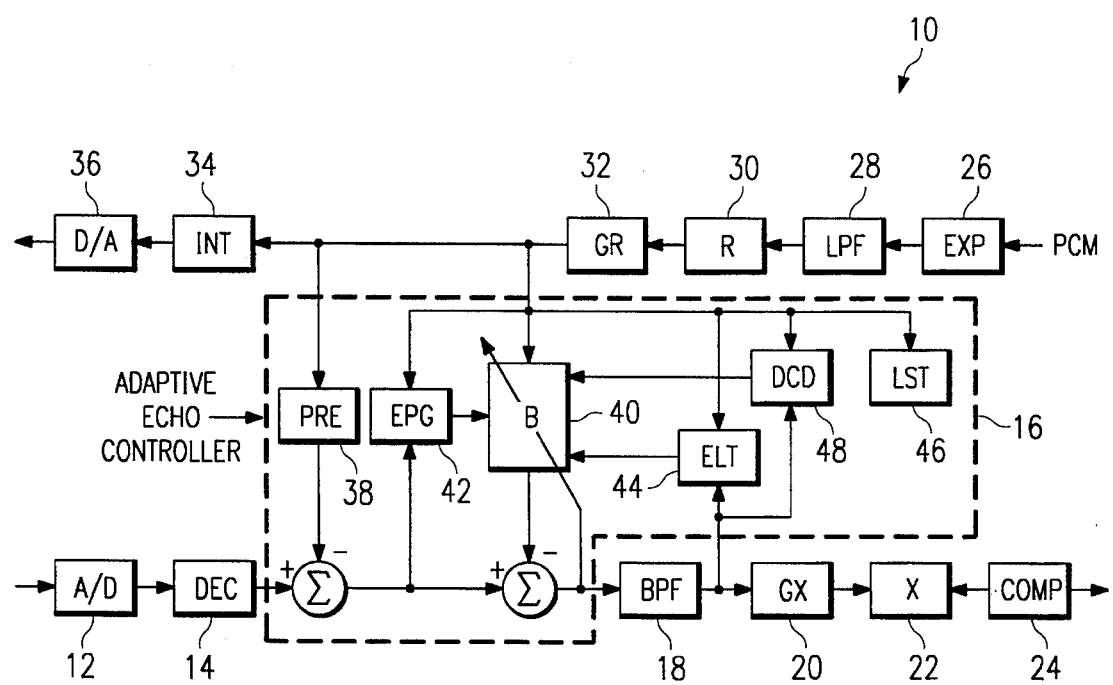
FIG. 1 is a block diagram of a subscriber line audio-processing circuit including a decorrelation controller according to the teachings of the present invention.

Referring now to the drawings wherein like or similar elements are designated with identical reference numerals throughout the several views and, more particularly to FIG. 1, there is shown a subscriber line audio processing unit 10 including an inventive filter arrangement according to the teachings of the present invention. The subscriber line audio processing unit 10 operates to convert an analog voice signal into digital PCM samples and it also operates to convert PCM samples into an analog signal. During the conversion processes, digital filters within the unit 10 are used to shape, band-limit, and control the gain of the voice signal. Also, as is discussed in greater detail hereinbelow, the unit 10 includes components that provide an adaptive balance function for adaptive echo cancellation.

Continuing to refer to FIG. 1, it may be seen that the transmit path is generally depicted by arrows pointing towards the right, and the receive path is generally depicted by arrows pointing towards the left. The transmit path, it should be apparent, converts an analog voice signal into digital PCM samples. The unit 10 depicted in FIG. 1 has an analog to digital (A/D) converter 12, associated decimators (DEC) 14, an adaptive echo controller 16, a bandpass filter (BPF) 18, a transmit gain control block (GX) 20, an equalization block (X) 22, and an A/u-law compressor (COMP) 24 in its transmit path. The A/D converter 12 and associated decimators 14 convert the analog signal into a digital linear code. The bandpass filter 18 rejects 50/60 Hz induction and signals above 4 KHz. The transmit gain control and equalization blocks 20, 22 provide amplitude and frequency response correction. The A/u-law compressor 24 provides linear to PCM conversion. The structure of and operation of the adaptive echo controller 16 is discussed in detail further below.

Unit 10's receive path converts digital PCM samples into an analog signal. In the receive path depicted in FIG. 1, an expander (EXP) 26 performs PCM to linear conversion. The output of the expander 26 is input to a low pass filter (LPF) 28 that band-limits the signal below 4 KHz. The output of the low pass filter 28 is then input to equalization and receive gain control blocks (R and GR, respectively) 30, 32 for amplitude and frequency response correction. The output of the receive gain control block 32 is then input to interpolators (INT) 34 and a digital to analog (D/A) converter 36 associated therewith to convert the linear code into an analog signal.

Continuing to refer to FIG. 1, and as previously mentioned, the subscriber line audio processing unit 10 also includes an adaptive echo controller 16. This controller 16 comprises a pre-balance circuit (PRE) 38, an adaptive balance filter (B) 40, an echo path gain detector (EPG) 42, an error level threshold (ELT) 44, a low-level signal detector (LST) 46, and a decorrelation controller (DCD) 48. The adaptive echo controller 16 is digital in nature and has two inputs. One input is the output of the receive gain control block 32 and the other input is the output of the decimator 14. The former input is for reception of far-end signals and the latter input is for receiving the echo and/or the near-end talker. The output of the adaptive echo controller 16, containing an echo residual and/or a near-end talker signal, is fed to the bandpass filter 18 in the transmit path.

The adaptive balance filter 40 operates to cancel the echo reflected from an impedance mismatch point into the transmit path. This filter 40, by evaluating the echo residual following an echo cancellation subtractor prior to the bandpass filter 18, adjusts its transfer function as close as possible to the transfer function of the echo path via an adaptive process. Typically, adaptive balance filters such as filter 40 operate based upon a least mean square or sign algorithm.

The echo path gain detector 42 consists of two signal level detectors and one comparator. These subelements cooperate to sense and compare the outputs of the receive gain control block 32 and the pre-balance circuit 38. If the signal power of the pre-balance circuit 38's subtractor output is higher than that of the receive gain control block 32's output by a predetermined threshold, the adaptive balance filter 40's adaptation is stopped. This prevents a bursting loop instability when the echo controller is connected to a far-end line circuit and a 4-wire loop is then formed. If the trans-hybrid loss of the distant 2 to 4 wire hybrid is small, an active near-end signal of the echo controller will be transmitted to and received back as a far-end signal through the distant hybrid with a small loss. Under this condition, the adaptive balance filter tends to cancel the near-end signal, i.e., itself, and thereby reduces the far-end signal. Responsive to the decreasing far-end signal, the echo residual will increase, which again increases the far-end signal. The alternative sequence of an increasing and decreasing echo residual ( or equivalently the far-end signal) is actually a bursting loop oscillation. By selecting a proper value of an echo path gain detector 42 threshold, that is, a value which is less than the value of the trans-hybrid loss of the distant hybrid, the adaptation will be stopped before an oscillation starts. However, if the threshold is set too low in a normal operating mode, the echo reflected from a high impedance subscriber loop will trigger the echo path gain detector 42 and then stop the adaptation. Therefore, it is very important that a pre-balance circuit should be introduced, as described below, which will allow a relatively low echo path gain threshold.

The pre-balance circuit 38, which may be embodied by a one tap digital subtractor, is used to reduce the echo by at least 6 dB prior to being input to the fine-tuning adaptive balance filter 40. In addition, to reduce the dynamic range of the adaptive balance filter 40, the pre-balance circuit 38 allows the echo path gain detector 42 to have a 6 dB lower threshold so that no instability will occur under normal operating conditions and so that the echo path gain detector 42 will not actuate with a high impedance load.

Continuing to discuss the various components of the adaptive echo controller shown in FIG. 1, the error level threshold 44, which may consist of two signal level detectors and one comparator, monitors and compares the output of the receive gain control 32 and the echo residual signal level at the output of the bandpass filter 18. The adaptation will continue to iterate until the ratio of the echo residual over the receive gain control output falls below the error level threshold. This controls the level of echo cancellation.

The low-level signal detector 46 depicted in FIG. 1 comprises a signal level detector and a comparator. These two components monitor gain receive control output against a pre-set threshold. The adaptation will be stopped when the gain receive control output signal level is below that threshold. This feature is needed because the continuous adaptation will introduce noises which will impair transmission performance when the signal is small.

Figure 2:
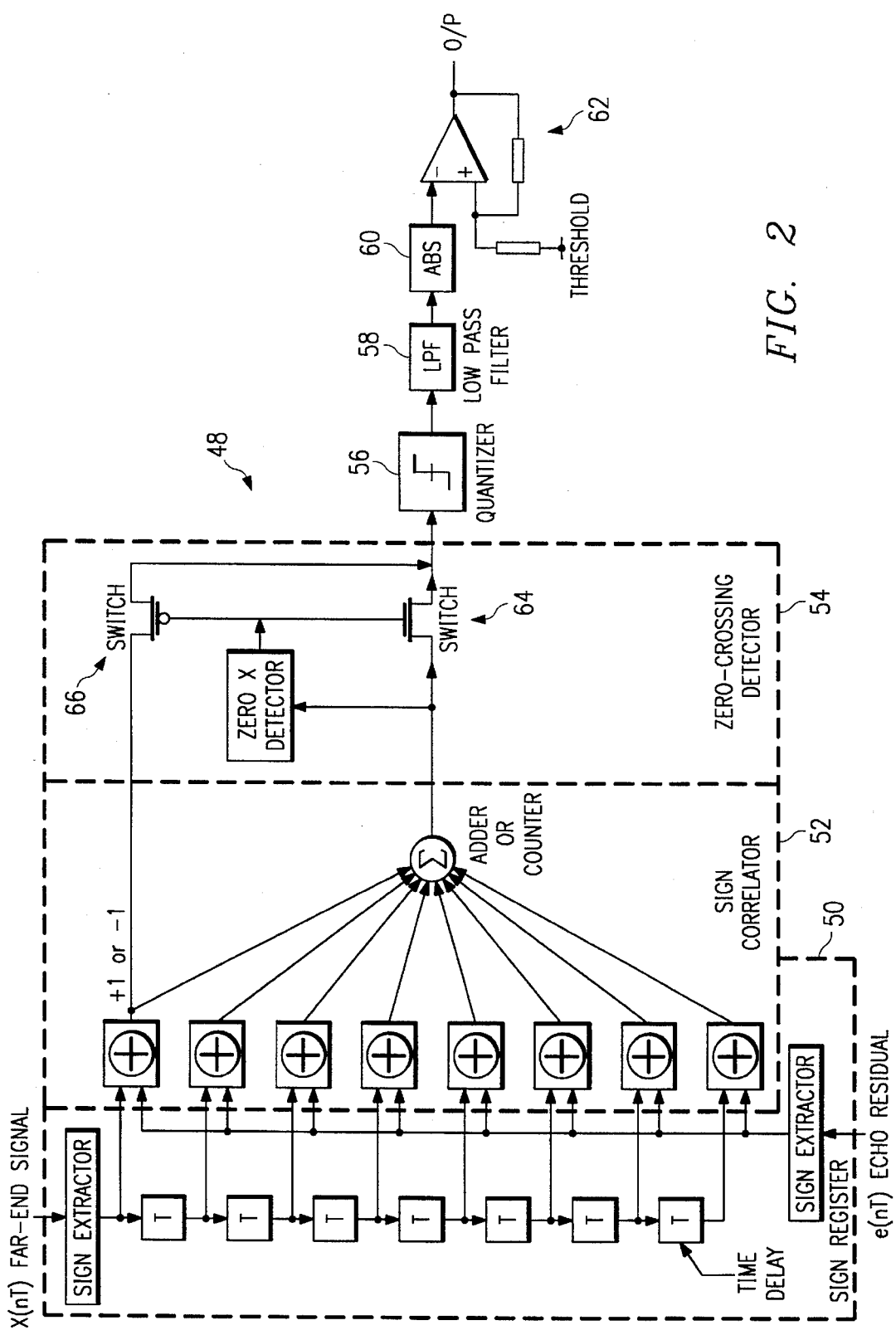
FIG. 2 is a block diagram of a decorrelation controller according to the teachings of the present invention.

The final major subcomponent of the adaptive echo controller 16 depicted in FIG. 1 is the decorrelation controller 48. This controller 48, which controls the adaptive balance filter 40 of the echo controller 16 by detecting the cross correlation between a far-end signal and an echo residual, is shown in greater detail in FIG. 2. The decorrelation controller 48 may be seen in FIG. 2 to consist of a sign register 50, a sign correlator 52, a zero-crossing detector 54, a quantizer 56, a low pass filter 58, an absolute value extractor 60, and a comparator 62. There are two inputs to the controller 48: a signal from the gain receive control 32 and the echo residual following the bandpass filter 18. The sensing point of echo residual signal must be located right after the bandpass filter because of the 50/60 Hz power line induction which, if the amplitude is high, may show a strong decorrelation with a far-end signal. This would halt the adaptation. The output of the decorrelation controller, with an adaptation ON/OFF indication, is fed to the adaptive balance filter 40 (shown in FIG. 1) where activation or deactivation of the adaptation is controlled.

Decorrelation detection, as taught herein, is based on the fact that if two signals are totally uncorrelated, the sum of the multiplication of the two signals over a period of time will be zero. Similarly, it is also true that if the sum of the multiplication of the sign of two signals is approaching zero, then the two signals are virtually decorrelated. Generally, sign multiplication calculations are much simpler to perform than amplitude multiplication calculations, and have the same effect if the sum is integrated over long enough period of time.

Referring back to FIG. 1, the adaptive echo controller 16 can be viewed as a decorrelation machine which uses adaptive control to decorrelate the echo residual from the far-end signal by adjusting its balance filter. The present invention, therefore, in certain embodiments, comprises a unique sign based decorrelation controller 48 which detects decorrelation and controls echo cancellation. The decorrelation controller 48, according to the teachings of the present invention, is independent of a near-end talker signal level as long as the far-end and near-end signals are uncorrelated. Conveniently, the far-end and near-end signals are always uncorrelated in telephony applications.

Referring once again to FIG. 2, the decorrelation controller 48 contains a sign register 50 which stores the sign (plus or minus) of the current and up to seven previous samples coming from the far-end. The sign of the far-end signal sample, i.e., x(nT), is first extracted and stored in the register. As time passes, the sign bit will be shifted down once every sample clock T. As a result of first-in, first-out shifting, the sign register 50 will always store the sign of the most recent eight samples, i.e., x(nT), x(nT–T), x(nT–2T), ..., x(nT–7T). The eight outputs of the sign register 50 are then connected to the inputs of the sign correlator 52.

The sign correlator 52 of the decorrelation controller 48 consists of an array of eight exclusive OR gates with inputs coming from the sign register 50 and the sign extractor of the current echo residual e(nT). The output of the eight exclusive OR gates are then summed together to form a sign correlator 52 output. Functionally, the sign correlator 52 performs correlation detection based upon the sign of the current echo residual sample and the sign of the most recent eight far-end signal samples, as shown in the following:

$$\text{Correlation value (at } nT) = \sum_{K=0}^{7} \text{Sign}(e(nT)) \oplus \text{Sign}(x(nT - kT))$$

where $\oplus$ stands for an exclusive OR function with input and output relationships as follows:

| X | Y | Z = X $\oplus$ Y |
|---|---|---|
| +1 | +1 | –1 |
| +1 | –1 | +1 |
| –1 | +1 | +1 |
| –1 | –1 | –1 |

The output of the sign correlator 52, with the value varying between –8 and +8, is routed through a switch 64 controlled by the zero crossing detector 54. The resulting correlation output value of the sign correlator 52 is passed through the switch to the quantizer 56, if it is non-zero. On the other hand, if the sign correlator output is zero, another switch 66 is turned on, allowing only the output of the first exclusive OR gate to pass to the quantizer 56. This is intended to work with a pure tone excitation in which one particular frequency (depending on the sampling rate, for instance, 2 kHz tone at 16 kHz sampling) may always result in zero correlation output regardless of the outcome of the echo controller.

The decorrelation controller 48's quantizer 56 converts the output of the sign correlator 52 from a range of –8 to +8 to a quantized value of –1 or +1 depending on the sign of the correlator output. Such quantization is required to ensure a uniform and accurate detection with an input signal varying from 200 Hz to 3400 Hz due to the fact that low frequency signals tend to have same sign for a longer period of time than do high frequency signals.

Subsequent to the quantizer 56, a digital low pass filter 58 is incorporated for the short term integration of a quantized series of +1's and –1's from the quantizer 56. The low pass filter 58 smoothes out the output and provides a short term averaged correlation value. The low pass filter 58 is then followed by an absolute value extractor 60 which strips off the sign from the low pass filter output and feeds the unsigned value to the comparator 62.

Comparator 62, characterized by hystersis, is included in the decorrelation controller 48 to compare the averaged correlation value against a pre-determined threshold. The output of the comparator 62, which indicates the status of the correlation, is then fed to the adaptive balance filter 40 (see FIG. 1) for the activation or deactivation of the adaptation.

Figure 3:
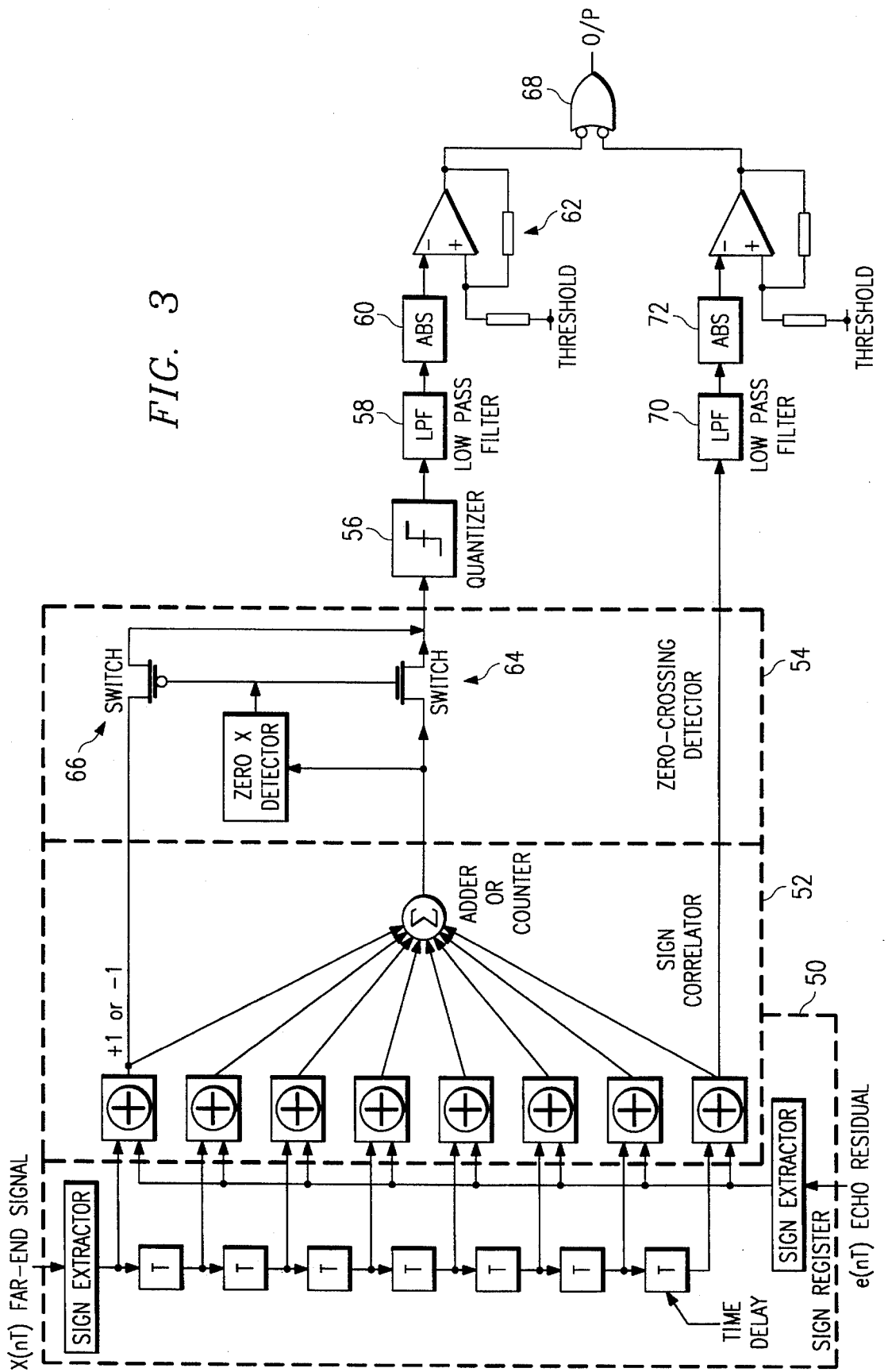
FIG. 3 is another block diagram of a decorrelation controller according to the teachings of the present invention.

A derivative of the decorrelation controller 48 is shown in FIG. 3. The derivative decorrelation controller shown in FIG. 3 is especially designed for applications which need an enhanced re-adaptability. It provides this by adding a one tap decorrelation detector which checks the correlation between the current echo residual sample and the previous seventh far-end signal sample. The decorrelation controller shown in FIG. 3 differs from the one shown in FIG. 2 by having an OR gate 68, low pass filter 70 and absolute value extractor 72.

Based upon the foregoing, those skilled in the art should now well appreciate that the present invention provides a sign-based decorrelation detection and adaptive control arrangement designed to detect cross-correlation between a far-end signal and an echo residual following a balance filter. Those skilled in the art should also understand and appreciate how embodiments of the present invention simply and effectively prevent excessive adaptation of a balance filter and, thus, prevent balance filter tone divergence. The present invention also provides a means for an adaptive balance filter to operate reliably under a double-talker condition without a need for a double-talker detector. This characteristic of embodiments of the present invention makes them especially well suited to be employed in high speed duplex modem or DTMF reception applications. Still further, the present invention provides a simple and cost effective means to facilitate modem connection without requiring use of a modem answer tone detector, a device which is relatively complicated and costly.

Obviously, numerous modifications and variations of the present invention may be made in light of the teachings above. For example, it is possible to switch the order of various subelements in the embodiments of the present invention described herein and still have a wholly satisfactory system, which system is capable of performing all functions required to be performed in an embodiment of the present invention. One may, by way of example, move the bandpass filter 18 in the circuit shown in FIG. 1 to a point between the equalization block 22 and the compressor 24. This has actually been done by the inventors of the present invention and found to work well, provided the error level threshold 44 and decorrelation controller 48 tap is connected to a point between the compressor block 24 and the bandpass filter 18. Many other such embodiments may be developed. Accordingly, within the scope of the appended claims, the present invention may be practiced otherwise than as specifically described herein.

What is claimed is:

1. A decorrelation control system for controlling an adaptive echo controller of the type that receives as a first input far-end signals and as a second input echo signals, and further of the type that outputs an echo residual signal having a sign value, said system comprising:

a sign register means for storing the signs of signal samples, which signs of signal samples are output therefrom;

a sign correlator means connected in said system to receive the output of said sign register and the sign of said echo residual signal for detecting the correlation thereof and for outputting a signal having a value reflective thereof;

a zero-crossing detector means operatively connected to said sign correlator means for imparting a nonzero value to said output signal of said sign correlator means when said output signal value is zero;

a quantizer means for limiting said output signal of said sign correlator means after processing by said zero-crossing detector, said quantizer means thereby outputting a limited output signal;

a first low pass filter means connected in said system to said quantizer means so as to receive said limited output signal, said low pass filter altering said limited output signal so that a short term averaged correlation value may be derived, said short term averaged correlation value having a sign;

an absolute value extractor means for stripping off the sign of the short term averaged correlation value; and a comparator means for comparing an unsigned averaged correlation value with a threshold and for providing an output signal for controlling said adaptive echo controller, wherein said sign register means, said correlator means, said zero-crossing detector means, said quantizer means, said first low pass filter means, said absolute value extractor means, and said comparator means are serially connected.

2. A decorrelation control system as recited in claim 1, further comprising a one tap correlation detection and an OR gate, with a second low pass filter means and an absolute value extractor connected serially in circuit therebetween.

3. A decorrelation control system as recited in claim 1, wherein said sign register means comprises a plurality of sign extractors and a plurality of unit time delay registers, wherein said plurality of sign extractors are connected serially, and wherein said plurality of unit time delay registers are also connected serially and interleaved with said plurality of unit time delay registers so that a plurality of succeeding sign values can be stored.

4. A decorrelation control system as recited in claim 3, wherein said plurality of unit time delay registers is at least seven.

5. A sign correlator apparatus for a decorrelation control arrangement as cited in claim 1, wherein signals are sampled over time so that any given number of most recent signal samples has meaning, and wherein said sign correlator means comprises means for the correlation detection of current echo residual and the at least eight most recent signal samples.

6. A decorrelation control system as recited in claim 5, wherein said means for the correlation detection of current echo residual and the at least eight most recent signal samples comprises an array of exclusive OR gates arranged serially and so as to connect in parallel to an adder counter.

7. An adaptive echo controller system of the type receiving an input signal and generating therefrom an output signal forwarded to a bandpass filter means, and further of the type wherein an echo is reflected from an impedance mismatch point into a transmit path, said system comprising:

an adaptive balance filter means, said adaptive balance filter means acting to cancel said echo leaving an echo residual signal, said adaptive balance filter means being electrically connected to a first node;

a pre-balance circuit means for reducing said echo prior to being input to said adaptive balance filter means, said pre-balance circuit means being electrically connected to said first node;

an echo path gain control means for preventing bursting loop instability that can result when said echo controller system is connected to a far-end line circuit and a 4-line loop is then formed, said echo path gain control means being electrically connected to said first node;

an error level threshold means for controlling the echo cancellation to a pre-determined level by using the echo residual signal, said error level threshold means being electrically connected to said first node;

a low level signal detector means for stopping the adaptation when said input signal is smaller than a threshold, said low level signal detector being electrically connected to said first node; and a decorrelation controller means for controlling the adaptation with or without the presence of a double-talker condition, said decorrelation controller being electrically connected to said first node.

8. An adaptive echo controller system as recited in claim 7, wherein said adaptive echo controller is of the type that receives as a first input far-end signals and as a second input echo signals, and further of the type that outputs an echo residual signal having a sign value, wherein said decorrelation controller means comprises:

a sign register means for storing the signs of signal samples, which signs of signal samples are output therefrom;

a sign correlator means connected said system to receive the output of said sign register and the sign of echo residual signal for detecting the correlation of two signals and for outputting a signal having a value reflective thereof;

a zero-crossing detector means operatively connected to said sign correlator means for imparting a nonzero value to said output signal of said sign correlator means when said output signal value is zero;

a quantizer means for limiting said output signal of said sign correlator means after processing by said zero-crossing detector, said quantizer means thereby outputting a limited output signal;

a low pass filter means connected in said system to said quantizer means so as to receive said limited output signal value, said low pass filter altering said limited output signal so that a short term averaged correlation value may be derived, said short term averaged correlation value having a sign;

an absolute value extractor means for stripping off the sign of the averaged correlation value; and a comparator means for comparing an unsigned averaged correlation value with a threshold, wherein said sign register means, said sign correlator means, said zero-crossing detector means, said quantizer means, said low pass filter means, said absolute value extractor means, and said comparator means are serially connected.

* * * * *